(12) United States Patent
Thrap

(10) Patent No.: US 6,806,686 B1
(45) Date of Patent: Oct. 19, 2004

(54) CHARGE BALANCING CIRCUIT

(75) Inventor: Guy C. Thrap, Del Mar, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/423,708

(22) Filed: Apr. 25, 2003

(51) Int. Cl.[7] .................................................. H02J 7/00
(52) U.S. Cl. ..................................................... 320/118
(58) Field of Search ................................ 320/116, 118, 320/119, 121, 127, 128

(56) References Cited

U.S. PATENT DOCUMENTS

| | | |
|---|---|---|
| 3,237,078 A | 2/1966 | Mallory |
| 4,053,824 A | 10/1977 | Dupuis et al. |
| 4,238,721 A | 12/1980 | DeLuca et al. |
| 4,242,627 A | 12/1980 | Kisiel |
| 4,303,877 A | 12/1981 | Meinhold |
| 4,449,091 A | 5/1984 | Otoi |
| 4,814,692 A | 3/1989 | Baumann |
| 4,821,724 A | 4/1989 | Whigham et al. |
| 4,903,700 A | 2/1990 | Whigman et al. |
| 5,479,083 A | 12/1995 | Brainard |
| 5,504,415 A | 4/1996 | Podrazhansky et al. |
| 5,524,488 A | 6/1996 | Foote |
| 5,532,665 A | 7/1996 | Foote et al. |
| 5,578,914 A | 11/1996 | Morita |
| 5,587,530 A | 12/1996 | Foote et al. |
| 5,710,504 A | 1/1998 | Pascual et al. |
| 5,747,968 A | 5/1998 | Merritt et al. |
| 5,773,959 A | 6/1998 | Merritt et al. |
| 5,821,733 A | 10/1998 | Turnbull |
| 5,886,502 A * | 3/1999 | Higashijima ................ 320/118 |
| 5,905,360 A | 5/1999 | Ukita |
| 5,932,932 A | 8/1999 | Agatsuma et al. |
| 5,943,224 A | 8/1999 | Mao |
| 5,956,241 A | 9/1999 | LoCascio |
| 5,982,050 A | 11/1999 | Matsui |
| 5,982,144 A | 11/1999 | Johnson et al. |
| 6,008,623 A | 12/1999 | Chen et al. |
| 6,043,628 A | 3/2000 | Perelle et al. |
| 6,046,573 A | 4/2000 | Wikstrom |
| 6,064,178 A | 5/2000 | Miller |
| 6,104,164 A | 8/2000 | Iino et al. |
| 6,114,835 A | 9/2000 | Price |
| 6,121,751 A | 9/2000 | Merritt |
| 6,140,800 A | 10/2000 | Peterson |
| 6,452,363 B1 | 9/2002 | Jabaji |
| 2001/0019256 A1 * | 9/2001 | Olsson et al. ................ 320/118 |

* cited by examiner

Primary Examiner—Edward H. Tso
(74) Attorney, Agent, or Firm—Foley & Lardner LLP

(57) ABSTRACT

A charge balancing circuit is disclosed that is configured to provide charge balancing for a bank of series connected charge storage devices such as capacitors. One embodiment of the charge balancing circuit comprises a voltage divider, an operational amplifier, and a negative feedback resistor connected between every two capacitors. The circuit is configured to monitor the voltage in each of the capacitors and, if the voltage in one of the capacitors is higher than the other, the circuit transfers energy from the higher charged capacitor to the lower charged capacitor until the capacitors are balanced. A current limiting resistor can be included for limiting the output current of the operational amplifier to a safe value and for providing feedback information regarding the health of the capacitor. An additional gain stage can also be included for increasing the output current of the operational amplifier for banks of large charge storage devices such as capacitors.

30 Claims, 4 Drawing Sheets

CHARGE BALANCING CIRCUIT

FIELD OF THE INVENTION

This invention relates to charge balancing electronic circuitry. More specifically, this invention relates to low cost, linear charge balancing circuits that automatically balance voltages between two or more charge storage devices, such as capacitors, connected in series.

BACKGROUND OF THE INVENTION

Charge storage devices, such as capacitors and ultracapacitors configured to provide a short term power supply or boost, are often used as part of a device bank comprising a series string of devices. The use of a bank of capacitors, rather than a single capacitor, can provide higher voltage delivery or a greater capacity through increased amp-hours. Individual capacitors included in such a bank, however, can have a tendency to accept a charge at different rates or can become unbalanced through charging or discharge. This imbalance can cause overvoltage problems causing one or more of the capacitors in the bank to have a catastrophic failure.

In order to address these problems, a number of complicated solutions have been proposed which protect against a capacitor becoming overcharged to the point of failure. For example, one such solution comprises using diode-type devices, such as zener diodes, to shunt each capacitor in the bank when the individual capacitor reaches a predetermined threshold. The value of each diode-type device must be specifically selected for each particular application to match the predetermined threshold for that application. Once the capacitor is charged to the predetermined threshold, the diode-type device causes any continuing charging current to be shunted around the capacitor protecting the capacitor from overcharging.

The diode-type device solution, while capable of providing overcharging protection, is imperfect in that it comes with various disadvantages in its implementation. For example, usable diode-type devices typically do not provide a perfect shunt around the capacitor. As such, the devices dissipate energy, typically in the form of heat. This dissipated energy is wasted energy in that it is not being used to charge capacitors. The heat created during energy dissipation can also cause overheating problems in certain applications. Another disadvantage of diode-type devices is that they continue to draw current even after all capacitors in the bank have been charged. This continual current draw leads to additional wasted energy. One additional disadvantage of diode-type devices is that the diode values must be carefully selected for each specific application. In other words, each diode-based system is customized to a particular application. This inflexibility presents design and manufacture problems in that each new application requires a redesign of the diode values. Thus, it is difficult, and indeed in many cases impossible, to build a standard diode-based charge balancing circuit that can be used with various different capacitor banks.

Another proposed solution for a charge balancing circuit includes a passive resistive bridge comprising a series of resistors arranged in a predetermined configuration. Like the diode-type devices described above, resistive bridges also suffer from various disadvantages in their implementation. For example, resistive bridges typically leak substantial amounts of energy and, like diode-type devices, continue to leak energy even after the capacitors in the bank are fully charged. In addition, resistive bridges substantially slow down the time required to charge a capacitor bank.

More recently, solutions for charge balancing have been proposed which comprise complicated microprocessor-driven circuits that monitor such things as the charge and/or the charge/discharge rate of each individual capacitor in a bank as well as the overall charge of the entire bank. These circuits typically include switching logic, inductors, and/or other components that can be controlled by the microprocessor to protect each individual capacitor from becoming over charged. One major disadvantage of such microprocessor-driven circuits is that they are typically complex and expensive devices. While the microprocessor-driven circuits provide monitoring, recording and tracking capabilities which are typically not found in the solutions mentioned above, these additional capabilities are often duplicative of capabilities already available in the end user application in which the capacitor bank is applied. Thus, the added expense and complexity associated with microprocessor driven charge balancing circuits are often unnecessarily wasteful. Another disadvantage is that microprocessor-driven solutions typically come with a high quiescent current. Thus, to minimize energy waste caused by the high quiescent current, the microprocessor must be capable of being turned off when it is not needed. The control logic needed for turning the microprocessor on and off at the appropriate time further increases the expense and complexity of these microprocessor-driven circuits.

Thus there is a need for a simple, inexpensive, flexible charge balancing circuit that minimizes energy waste while providing overvoltage protection for individual capacitors in a capacitor bank.

SUMMARY OF THE INVENTION

These and other needs are satisfied by a charge balancing circuit according to the present invention which comprises a voltage divider, an operational amplifier, and a negative feedback resistor. In one embodiment, a charge balancing circuit according to the present invention can be configured for balancing the charge for two series connected charge storage devices such as capacitors. In addition, charge balancing circuits can be "stacked" to provide charge balancing and overvoltage protection for a bank of any length series string of capacitors.

The voltage divider is configured to equally divide the charge voltage across the capacitors in the bank and provide an input to the operational amplifier. The negative feedback resistor is configured to provide feedback information to another input of the operational amplifier, the feedback information relating to the voltage of the capacitors. In this manner, if the voltage of one of the capacitors is higher than the voltage of the other capacitor, the inputs to the operational amplifier are unbalanced. The operational amplifier is configured to provide an output current when the voltage divider input and feedback input do not match thus causing energy from the capacitor having a higher voltage to be transferred to the capacitor having a lower voltage.

In one embodiment, the voltage divider comprises two divider resistors connected to an input of the operational amplifier. Preferably, the divider resistors are of approximately the same value and the value of the resistors is high enough to minimize the quiescent current of the circuit. Also, preferably, the value of the negative feedback resistor can be approximately half that of the divider resistors so that the negative feedback resistor can cancel any input bias current supplied to the operational amplifier.

A current limiting resistor can also be included between the operational amplifier output and the capacitors. The current limiting resistor can be configured to limit the output current of the operational amplifier to a safe level. The voltage drop across the current limiting resistor can also provide information regarding the health of the capacitors being balanced by the charge balancing circuit. For example, the voltage drop across each current limiting resistor can be compared to the average voltage drop of all of the current limiting resistors. If the voltage drop of any current limiting resistor is significantly higher than the average, a problem may exist with one of the capacitors being serviced by the current limiting resistor.

In another embodiment, a gain stage can be included for increasing the output current of the operational amplifier. The gain stage can be particularly useful for banks employing large capacitors. The increased output current produced by the gain stage can be sufficient to overcome the leakage current of larger capacitors and can also increase the speed in which the capacitors are balanced. Preferably, the gain stage comprises two transistors connected between the operational amplifier output and the capacitors.

DETAILED DESCRIPTION OF THE PREFERRED EMBODIMENTS

In accordance with the present invention, a charge balancing circuit is described that provides distinct advantages when compared to those of the prior art. The invention can best be understood with reference to the accompanying drawing figures.

Figure 1:
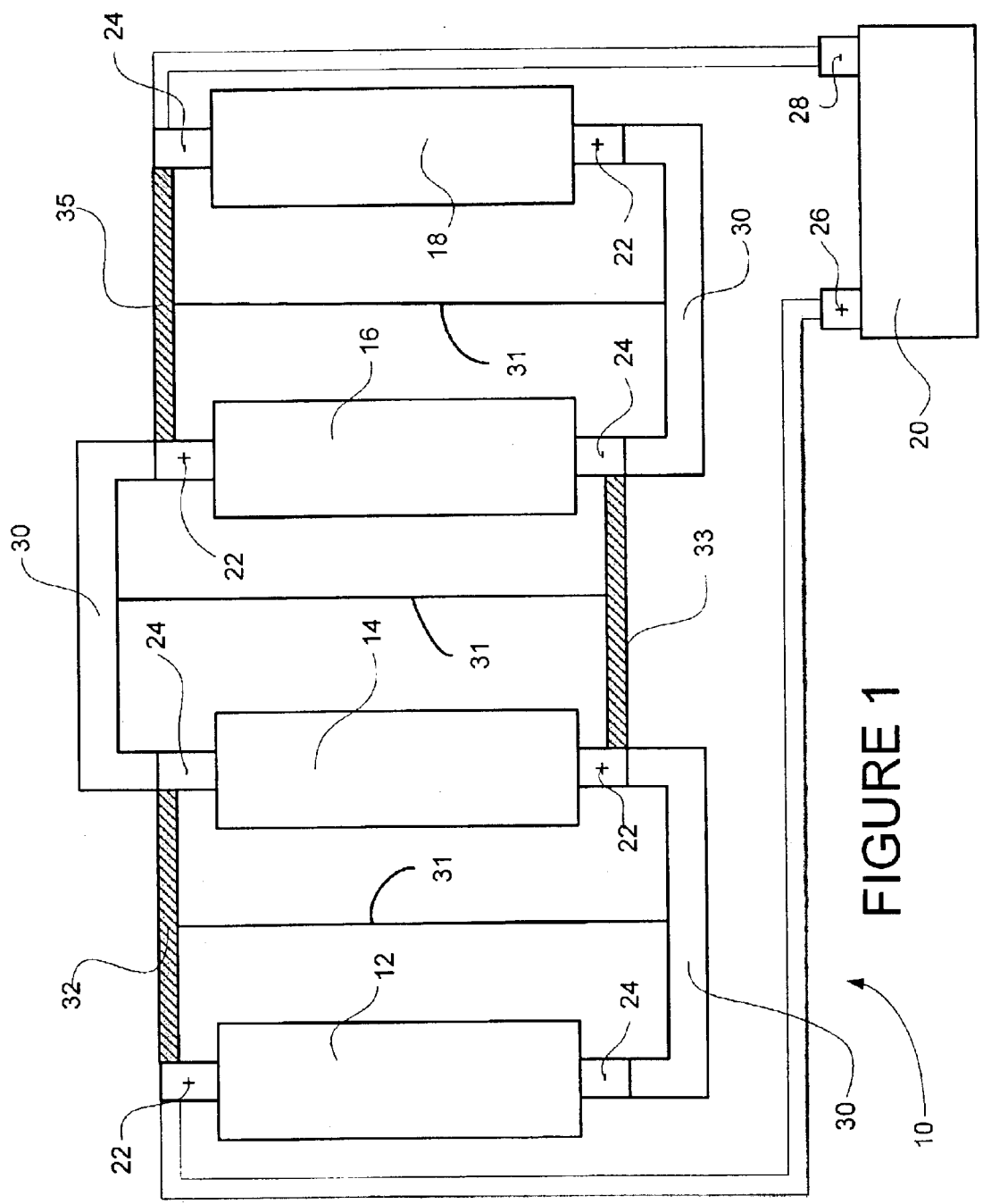
FIG. 1 is a side view of one embodiment of a capacitor bank including interconnecting capacitors having charge balancing circuits according to the present invention.

Referring now to the drawings, FIG. 1 shows a bank 10 of four interconnected ultra-capacitors 12, 14, 16, and 18. A charging device 20 configured for charging the ultra-capacitors 12, 14, 16, and 18 is connected across the bank 10. Each ultra-capacitor 12, 14, 16, and 18 includes a positive terminal 22 and a negative terminal 24. The charging device 20 also includes a positive terminal 26 and a negative terminal 28

The ultra-capacitors 12, 14, 16, and 18 are connected together in series by bus bars 30 to form the bank 10. Each bus bar 30 connects the negative terminal 24 of one ultra-capacitor (12 for example) to the positive terminal 22 of the adjacent ultra-capacitor (14 for example). Charge balancing circuits 32, 33, and 35 according to the present invention are connected between the positive terminal 22 of one ultra-capacitor (12 for example), the negative terminal 24 of the adjacent ultra-capacitor (14 for example), and the opposite bus bar 30 connecting the two ultra-capacitors (12 and 14 for example, through conductor 31).

The charging device 20 is configured to provide a voltage ($V_{charge}$) across the ultra-capacitor bank 10. This voltage ($V_{charge}$) is used to provide energy to the ultra-capacitors 12, 14, 16, and 18, which is stored in each ultra-capacitor 12, 14, 16, and 18 until the ultra-capacitors 12, 14, 16, and 18 are fully charged. The positive terminal 26 of the charging device 20 is connected to the positive terminal 22 of the first ultra-capacitor 12 in the bank 10 and the negative terminal 28 of the charging device 20 is connected to the negative terminal 24 of the last ultra-capacitor 18 in the bank 10.

As described above, one concern in charging a bank of charge storage devices, such as ultra-capacitors, is that one or more of the charge storage devices may become over charged due to an imbalance in the retained charge or charge rate of the device. This overcharging can result in a catastrophic failure causing the device to become unusable and causing safety concerns. Charge balancing circuits 32, 33, and 35 according to the present invention distribute the energy evenly across each of the ultra-capacitors 12, 14, 16, and 18 in the bank 10. Thus, a charge balancing circuit according to the present invention protects against inadvertent overcharging due to an imbalance of energy between the ultra-capacitors 12, 14, 16, and 18. In other words, as long as the prorata portion of the energy for each ultra-capacitor does not exceed the voltage rating of the ultra-capacitor in a bank, a charge balancing circuit according to the present invention protects against overcharging by maintaining an energy balance between the ultra-capacitors.

Figure 2:
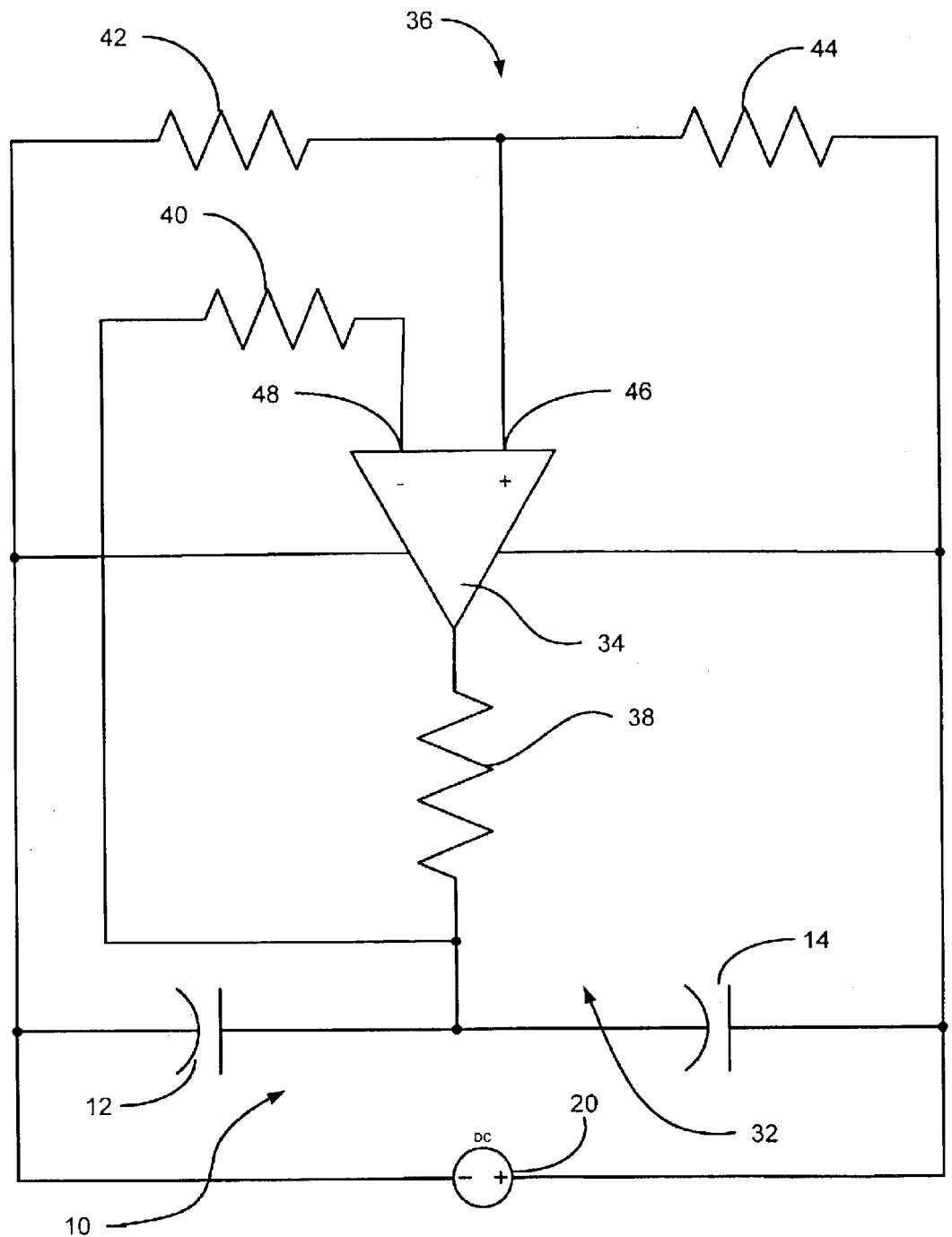
FIG. 2 is an electrical schematic diagram of one embodiment of a charge balancing circuit according to the present invention.

FIG. 2 is an electrical schematic diagram of one embodiment of a single charge balancing circuit 32 according to the present invention configured to provide charge balancing for a bank 10 comprising two capacitors 12 and 14. A charging device 20 is connected across the bank 10 and is configured to provide energy for charging the capacitors 12 and 14 in the bank 10. The charge balancing circuit 32 is configured to force the voltage across each of the capacitors 12 and 14 to be equal. As described in more detail below with respect to FIGS. 3 and 4, single charge balancing circuits, such as the one shown in FIG. 2, can be "stacked" to provide charge balancing for banks of capacitors which have more than two capacitors. In one embodiment of the invention, n-1 charge balancing circuits can be "stacked" together to provide charge balancing for n series connected capacitors.

The charge balancing circuit 32 comprises an operational amplifier 34, a voltage divider 36, a current limiting resistor 38, and a negative feedback resistor 40. Preferably, the voltage divider 36 comprises two resistors 42 and 44 configured to divide the supply voltage ($V_{charge}$) of the charging device 20 in half so that half the supply voltage ($V_{charge}$) is applied to the non-inverting input 46 of the operational amplifier 34. However, alternative embodiments of voltage divider 36 can be used to accomplish the same purpose. As described in more detail below, by applying half the supply voltage ($V_{charge}$), the charge balancing circuit 34 according to the present invention can ensure that the supply voltage ($V_{charge}$) is distributed equally across each of the capacitors 12 and 14 so that neither capacitor 12 and 14 becomes overcharged.

The current limiting resistor 38 is an optional component of charge balancing circuit 32 and is configured to limit the output current of the operational amplifier 34 to a safe level. Limiting the output current of the operational amplifier 34 can be used to prevent the operational amplifier 34 from overheating or from other potentially damaging effects which could shorten the life of the operational amplifier 34. In addition, the current limiting resistor 38 can be used for diagnostic and monitoring functions as described in more detail below.

The negative feedback resistor 40 is configured to monitor the voltage at the midpoint between capacitors 12 and 14 and provide a feedback voltage to the inverting input 48 of the operational amplifier 34. This midpoint voltage can be used to determine if the energy stored in capacitors 12 and 14 is equal or unbalanced. If a situation arises in which one of the capacitors (12 for example) is charged more than the other capacitor (14 for example), the operational amplifier 34 will sink or source current which will cause energy to be transferred from the higher charged capacitor (12 for example) to the lower charged capacitor (14 for example). As the capacitors 12 and 14 approach an identical charge level, the feedback voltage provided to the inverting input 48 of the operational amplifier 34 by the negative feedback resistor 40 will begin to approach the voltage supplied to the non-inverting input 46 of the operational amplifier 34 by the voltage divider 36. As the input voltages on both the non-inverting 46 and inverting 48 inputs of the operational amplifier 34 become equal, the output current of the operation amplifier 34 approaches zero.

Preferably, the resistors 42 and 44 comprising the voltage divider 36 are preselected to have relatively high resistances in order to minimize current draw. For example, in the embodiment shown in FIG. 2, with a supply voltage ($V_{charge}$) of 5 v, resistors 42 and 44 could be 1 MΩ resistors. The value of resistors 42 and 44 is selected so that the current drawn across each resistor 42 and 44 when the capacitors 12 and 14 are fully charged is less than the leakage current of the capacitors 12 and 14. In this manner, once the capacitors 12 and 14 are fully charged, the current drawn by the resistors 42 and 44 has little or no effect on the quiescent current of the circuit 34 In order to divide the supply voltage ($V_{charge}$) in half, resistors 42 and 44 should be of approximately equal value.

Ideally, the negative feedback resistor 40 should have a value of approximately one half that of resistors 42 and 44, so that the negative feedback resistor 40 can work to differentially cancel any input bias current supplied to the operational amplifier 34. As such, in the example discussed herein, the value of negative feedback resistor 40 could be approximately 500 kΩ. The value of the current limiting resistor 38 can be selected to protect the operational amplifier 34 from damage if one of the capacitors 12 and 14 becomes a short circuit. In order to do so, the value of the current limiting resistor 38 is selected so that the maximum drive current of the operational amplifier 34 remains within a safe range. Using the example discussed herein, with a 10 mA operational amplifier 34 and a 5 v supply voltage, preferably the value of the current limiting resistor 38 will be approximately 500 Ω (5 v/10 mA). A typical capacitor which could be used as capacitors 12 and 14 of the FIG. 2 could be a 10 farad capacitor.

While specific resistor, amplifier, capacitor, and supply voltage values are discussed with respect to the above example, a charge balancing circuit according to the present invention is not limited in any way by the values listed herein. The above example is meant to be only one possible way to implement a charge balancing circuit according to the present invention. The specific component values can vary greatly from the ones used in the above example without departing from the spirit and scope of the invention as defined in the appended claims. It should be noted that the above described embodiment of the charge balancing circuit 32 is flexible in that the individual component values do not have to be tied to the specific values of the capacitors which they are serving. Thus, unlike some of the solutions discussed in the background of the invention, a charge balancing circuit according to the present invention can be applied in different applications using different value capacitor banks without having to redesign the circuit.

Figure 3:
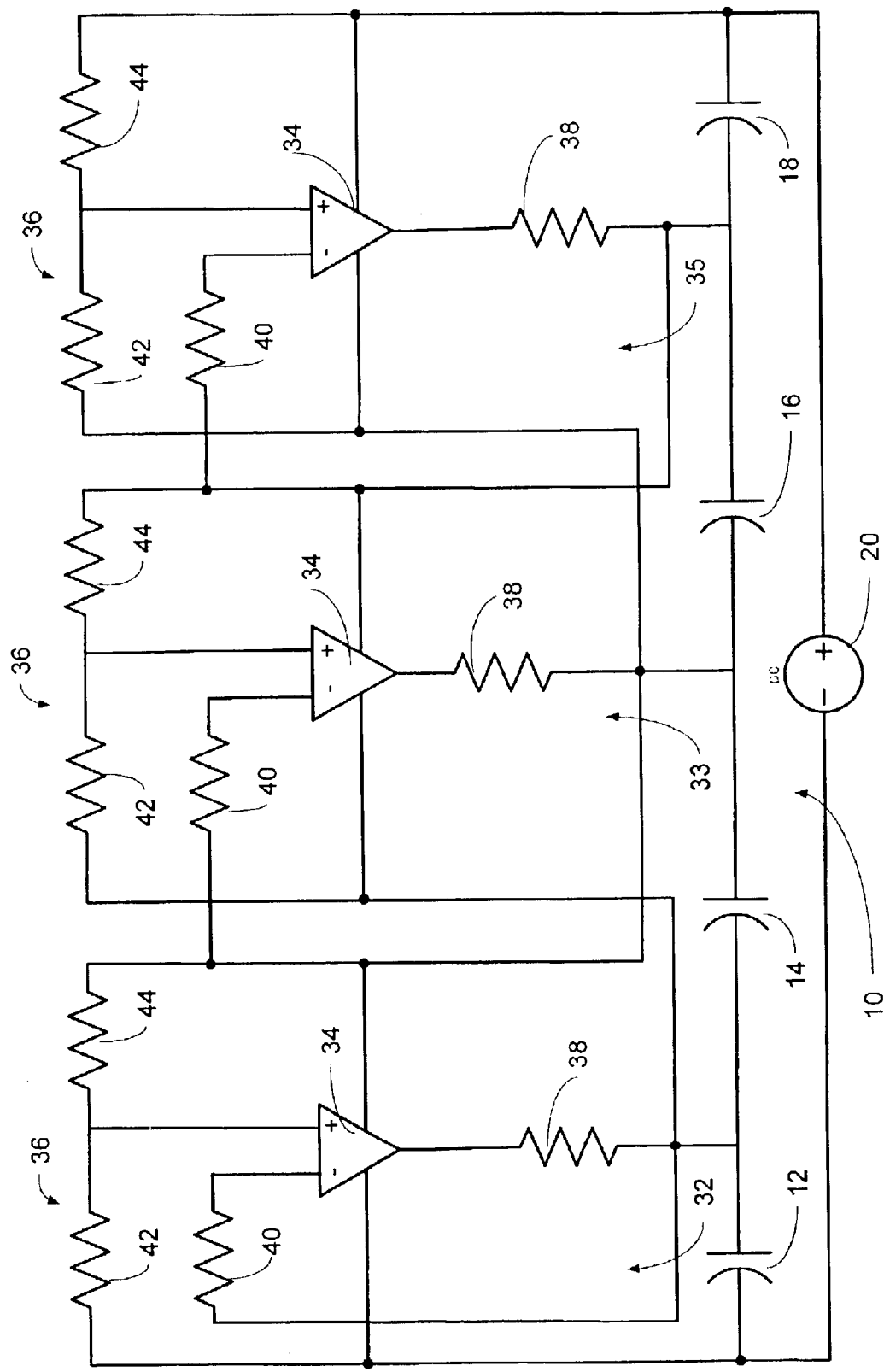
FIG. 3 is an electrical schematic diagram of one embodiment of the capacitor bank and charge balancing circuits of FIG. 1.

FIG. 3 illustrates an electrical schematic diagram of the bank 10 of capacitors 12, 14, 16, and 18 shown in FIG. 1. As can be seen from FIGS. 1 and 3, three charge balancing circuits 32, 33, and 35, according to the present invention, can be used to balance charging for the four capacitors 12, 14, 16, and 18 which comprise bank 10. Balancing circuit 32 is configured for balancing capacitors 12 and 14, balancing circuit 33 is configured for balancing capacitors 14 and 16, and balancing circuit 35 is configured for balancing capacitors 16 and 18.

Each balancing circuit 32, 33, and 35, comprises an operational amplifier 34, a voltage divider 36, a current limiting resistor 38, and a negative feedback resistor 40. Each voltage divider 36 can comprise two resistors 40 and 42 configured to equally divide the voltage across the capacitors serviced by the balancing circuit. Each balancing circuit 32, 33, and 35 can function as described with reference to FIG. 2. FIG. 3, however, shows how the balancing circuits 32, 33, and 35 can be "stacked" together. In this embodiment, supply device 20 is configured to provide a supply voltage of approximately 10 volts to charge capacitors 12, 14, 16, and 18.

Figure 4:
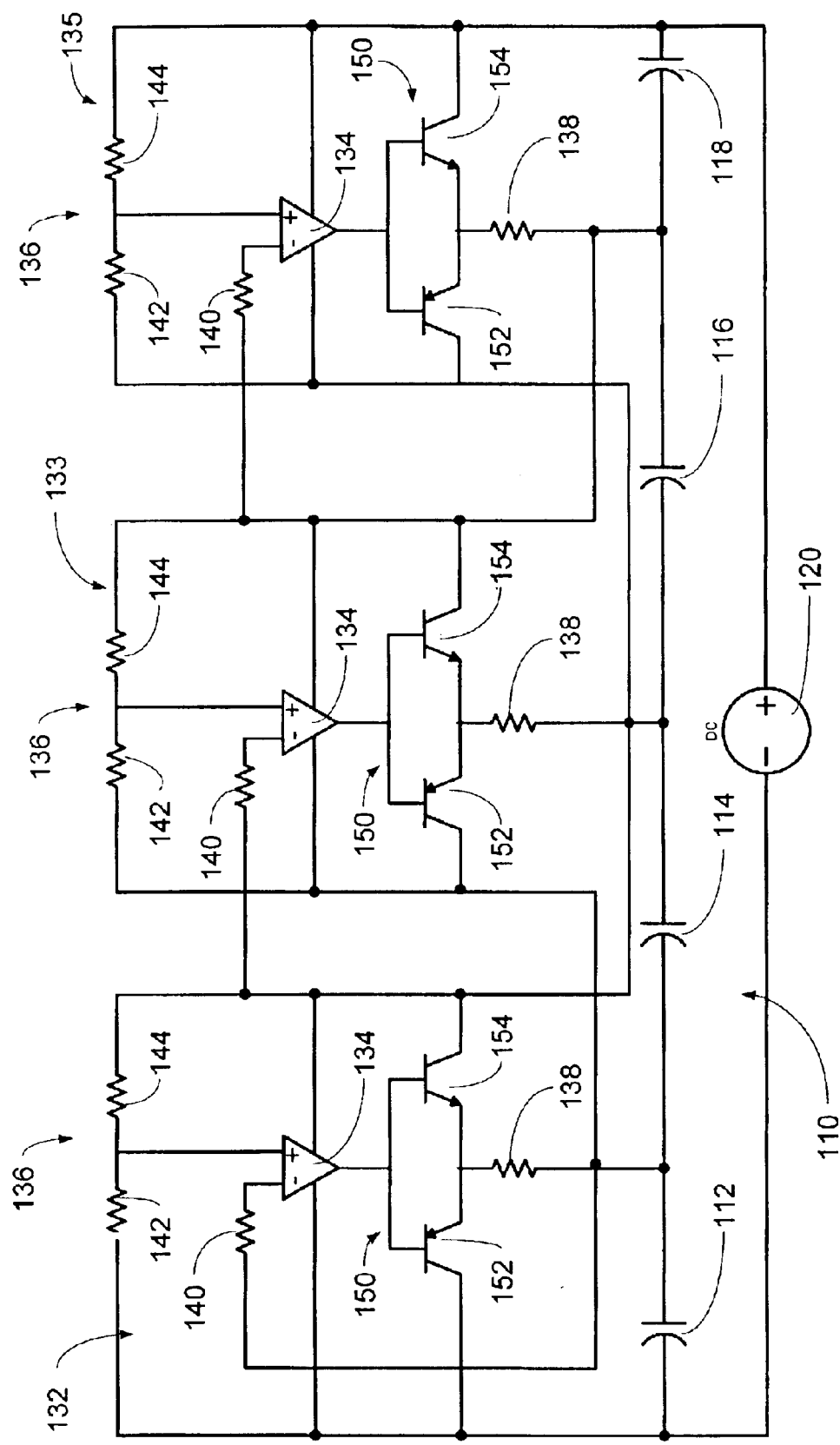
FIG. 4 is an electrical schematic diagram of an alternative embodiment of the capacitor bank and charge balancing circuits of FIG. 1.

In a configuration such as the ones shown in FIGS. 3 and 4, the current limiting resistors 38 can also provide monitoring and diagnostic functions. For example, the voltage drop across each of the current limiting resistors 38 can provide some information as to the health of the capacitors being serviced by each particular charge balancing circuit. By comparing the voltage drop across each individual current limiting resistor 38 to the average voltage drop across the current limiting resistors it is possible to detect problem capacitors even though the bank may appear to be functioning properly.

If the voltage drop across one of the current limiting resistors is significantly higher than the average voltage drop, this could indicate that one of the capacitors being serviced by the charge balancing circuit is on the verge of failure. Even though the capacitor may appear to functioning properly, the fact that it requires an excessive current draw to charge could indicate a problem with the capacitor. Thus, valuable information regarding the health of the each of the capacitors 12, 14, 16, and 18, can be gained by monitoring the voltage drop across each of the current limiting resistors 38.

This diagnostic and monitoring capability could be implemented in the end-user application by using a microprocessor running a software program configured to receive the current limiting resistor voltage drop data and process the data to determine the average voltage drop. The microprocessor can also be configured to trigger a warning or alarm if a problem is detected. Alternatively, if the end user application does not have this capability, a microprocessor could be added to the present invention. This would, however, present some of the disadvantages discussed in the background of the invention.

FIG. 4 illustrates an alternative embodiment of a charge balancing circuit according to the present invention. In banks employing large capacitors, such as 50 farad or higher value capacitors, it may be desirable to provide an additional gain stage to the charge balancing circuit shown in FIGS. 2 and 3. For example, large capacitors generally have a higher leakage current and it may be desirable to use a gain stage to compensate for the higher leakage current. In addition, a gain stage can be used to reduce the time needed to fully balance the voltages on large capacitors. FIG. 4 illustrates one example of a charge balancing circuit including a gain stage for providing charge balancing for banks employing large capacitors.

FIG. 4 illustrates a bank 110 of four capacitors 112, 114, 116, and 118 connected in series with three charge balancing circuits 132, 133, and 135 included for providing charge balancing for the capacitors 112, 114, 116, and 118. A charging device 20 is connected across the bank 110 and is configured to provide energy for charging the capacitors 112, 114, 116, and 118. The charge balancing circuits 132, 133, and 135 are configured to force the voltage across each of the capacitors 112, 114, 116, and 118 to be equal.

Each charge balancing circuit 132, 133, and 135 comprises an operational amplifier 134, a voltage divider 136, a current limiting resistor 138, a negative feedback resistor 140, and a gain stage 150. Preferably, each voltage divider 136 comprises two resistors 142 and 144 configured to equally divide the supply voltage across the capacitors 112, 114, 116, and 118 in the bank 110. Preferably, each gain stage 150 comprises two transistors 152 and 154 which form a complimentary emitter-follower transistor pair. In the embodiment shown in FIG. 4, the transistor 152 comprises a p-n-p emitter follower transistor and 154 comprises an n-p-n emitter-follower transistor. The bases and emitters of the transistors 152 and 154 are tied together while the collector of one transistor 152 is tied to the negative rail and the collector of the other transistor 154 is tied to the positive rail.

This embodiment of a charge balancing circuit 110 works similar to the one described above, however, in this embodiment, the output of the operational amplifier 134 is used to drive the gain stage 150. The gain stage 150 can be used to increase the maximum current output of the operational amplifier 134. For example, if the operational amplifier 134 is rated at 10 mA, the gain stage 150 can be configured to increase the deliverable current by using 300 mA transistors 152 and 154. Preferably, the transistors 152 and 154 can be configured to compensate for the worst case current leakage of capacitors 112, 114, 116, and 118.

One example of the embodiment illustrated in FIG. 4 can include a 10 mA operational amplifier 134, 100 kΩ resistors 142 and 144 in the voltage divider 136, a 50 kΩ negative feedback resistor 140, and a 5.6 Ω current limiting resistor 138. In this embodiment, the capacitors are 2800 farad capacitors and the voltage supply device 20 is configured to supply 10 volts. Because the leakage current of the large capacitors discussed in this example is much higher than the leakage current of the capacitors discussed with respect to the example relating to FIG. 2, 100 kΩ resistors can be used for resistors 142 and 144. Even though 100 kΩ resistors draw more current then the 1 MΩ resistors discussed with respect to the example values used for the embodiment shown in FIG. 2, this additional current is masked by the higher leakage current of the capacitors and thus has little or no effect on the quiescent current of the circuit 134.

The value of the current limiting resistor 138 can be designed for protecting transistors 152 and 154 by taking into consideration the saturation voltages of the transistors 152 and 154. Preferably, the value of the current limiting resistor 138 is calculated based on the supply voltage ($V_{charge}$), the maximum current rating of the transistors 152 and 154 ($I_{max}$), and the saturation voltages of the transistors 152 and 154 ($V_{be}+V_{ce\ sat}$). In the example discussed above, the value of the current limiting resistor 138 is calculated using the following equation:

$$(V_{charge}/2)-(V_{be}+V_{ce\ sat})/I_{max}$$

As with the values provided above with respect to FIG. 2, specific resistor, amplifier, capacitor, supply voltage, and transistor values are discussed with respect to this example, but a charge balancing circuit according to the present invention is not limited in any way by the values listed herein. The above examples are meant only to be illustrative of possible implementations of a charge balancing circuit according to the present invention. The specific component values can vary greatly from the ones used in the above examples without departing from the spirit and scope of the invention as defined in the appended claims.

In addition, while the particular systems and methods herein shown and described in detail are fully capable of attaining the above described object of this invention, it is understood that the description and drawings presented herein represent some, but not all, embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A charge balancing circuit for providing charge balancing for at least two charge storage devices connected in series, the at least two charge storage devices capable of being charged by a supply voltage, the charge balancing circuit comprising:
   a voltage divider for equally dividing the supply voltage across the at least two charge storage devices;
   an operational amplifier having inputs and an output, the operational amplifier being connected at its output between each at least two charge storage devices and the operational amplifier being connected to the voltage divider such that the voltage divider provides a voltage to an input of the operational amplifier;
   a negative, feedback resistor for providing feedback regarding a stored voltage in each of the at least two charge storage devices to an input of the operational amplifier;
   wherein the operational amplifier is configured to produce an output current when the stored voltage of a first of the at least two charge storage devices is higher than the stored voltage of a second of the at least two charge storage devices, the output current causing energy stored in the first charge storage device to be transferred to the second charge storage device until the at least two charge storage devices are balanced.

2. The charge balancing circuit of claim 1 further comprising a current limiting resistor connected between the operational amplifier and the at least two charge storage devices, the current limiting resistor being configured to limit the output current of the operational amplifier to a safe value.

3. The charge balancing circuit of claim 1 further comprising a gain stage for increasing the output current of the operation amplifier.

4. The charge balancing circuit of claim 1 wherein the voltage divider further comprises two divider resistors of approximately the same value connected to the operational amplifier.

5. The charge balancing circuit of claim 4 wherein the two divider resistors are of a value high enough to minimize the quiescent current draw of the circuit.

6. The charge balancing circuit of claim 1 wherein the negative feedback resistor is configured to cancel any input bias current supplied to the operational amplifier by the voltage divider.

7. The charge balancing circuit of claim 5 wherein the negative feedback resistor has a value of approximately half the value of each of the two divider resistors such that the negative feedback resistor can effectively cancel any input bias current supplied to the operational amplifier.

8. The charge balancing circuit of claim 2 wherein the current limiting resistor has a value equal to the supply voltage divided by the maximum output current of the operational amplifier.

9. The charge balancing circuit of claim 2 wherein a voltage drop across the current limiting resistor can be used to provide information regarding the health of the at least two charge storage devices.

10. The charge balancing circuit of claim 3 wherein each gain stage comprises two transistors connected between the operational amplifier output and the at least two charge storage devices.

11. The charge balancing circuit of claim 10 wherein each of the two transistors includes a base, emitter and collector and wherein the bases and emitters of each of the two transistors are connected together.

12. The charge balancing circuit of claim 10 wherein the two transistors form a complementary symmetry emitter follower transistor pair.

13. The charge balancing circuit of claim 10 further comprising a current limiting resistor connected between the gain stage and the at least two charge storage devices, the current limiting resistor being configured to limit the output current of the gain stage to a safe value.

14. The charge balancing circuit of claim 13 wherein the current limiting resistor has a value based on the supply voltage, the saturation current of the two transistors, and the maximum current rating of the two transistors.

15. The charge balancing circuit of claim 1 wherein the at least two charge storage devices are capacitors.

16. A charge balancing circuit for providing charge balancing for n charge storage devices connected in series, wherein n is greater than or equal to 2, the n charge storage devices capable of being charged by a supply voltage, the charge balancing circuit comprising:

n-1 voltage dividers for equally dividing the supply voltage across the n charge storage devices;

n-1 operational amplifiers having inputs and an output, each operational amplifier being connected at its output between two charge storage devices and each operational amplifier being connected to one of the n-1 voltage dividers such that each voltage divider provides a voltage to an input of an operational amplifier, n-1 negative feedback resistors, each negative feedback resistor connected to one of the n-1 operational amplifiers, the n-1 negative feedback resistors for providing feedback regarding stored voltage in the n charge storage devices to an input of one of the n-1 operational amplifiers;

wherein each operational amplifier is configured to produce an output current when the stored voltage at a first of the two charge storage devices to which it is connected is higher then the stored voltage at a second of the two charge storage devices to which it is connected, the output current causing energy stored in the first charge storage device to be transferred to the second charge storage device until the two charge storage devices are balanced.

17. The charge balancing circuit of claim 16 further comprising n-1 current limiting resistors, each current limiting resistor connected between an operational amplifier output and two charge storage devices, each current limiting resistor being configured to limit the output current of the operational amplifier to which it is connected to a safe value.

18. The charge balancing circuit of claim 16 further comprising n-1 gain stages, each gain stage configured to increase the output current of an operation amplifier.

19. The charge balancing circuit of claim 16 wherein each voltage divider further comprises two divider resistors of approximately the same value connected to one of the n-1 operational amplifiers.

20. The charge balancing circuit of claim 19 wherein the two divider resistors are of a value high enough to minimize the quiescent current draw of the circuit.

21. The charge balancing circuit of claim 16 wherein each negative feedback resistor is configured to cancel any input bias current supplied to the operational amplifier to which it is connected.

22. The charge balancing circuit of claim 20 wherein each negative feedback resistor has a value of approximately half the value of the two divider resistors such that the negative feedback resistor can effectively cancel any input bias current supplied to the operational amplifier to which it is connected.

23. The charge balancing circuit of claim 17 wherein a voltage drop across the n-1 current limiting resistors can be used to provide information regarding the health of the two charge storage devices to which each current limiting resistor is connected.

24. The charge balancing circuit of claim 18 wherein each gain stage comprises two transistors connected in parallel.

25. The charge balancing circuit of claim 24 wherein each of the two transistors includes a base, emitter and collector and wherein the bases and emitters of each of the two transistors are connected together.

26. The charge balancing circuit of claim 24 wherein the two transistors form a complementary symmetry emitter follower transistor pair.

27. The charge balancing circuit of claim 23 wherein the voltage drop across each current limiting resistor can be compared to an average voltage drop across the n-1 current liming resistors to determine the health of each of the n charge storage devices.

28. The charge balancing circuit of claim 24 further comprising n-1 current limiting resistors connected between each of the n-1 gain stages and two charge storage devices, the n-1 current limiting resistors being configured to limit the output current of the gain stage to a safe value.

29. The charge balancing circuit of claim 28 wherein each of the n-1 current limiting resistors has a value based on the supply voltage, the saturation current of the two transistors to which it is connected, and the maximum current rating of the two transistors to which it is connected.

30. The charge balancing circuit of claim 16 wherein the n charge storage devices are capacitors.

* * * * *